Oct. 26, 1965    E. E. STONE    3,214,209
MEANS FOR SUPPORTING AND TRANSPORTING PARALLELOGRAM CONTAINERS
Filed Aug. 23, 1963
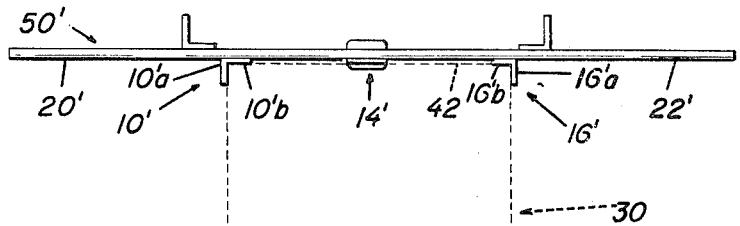
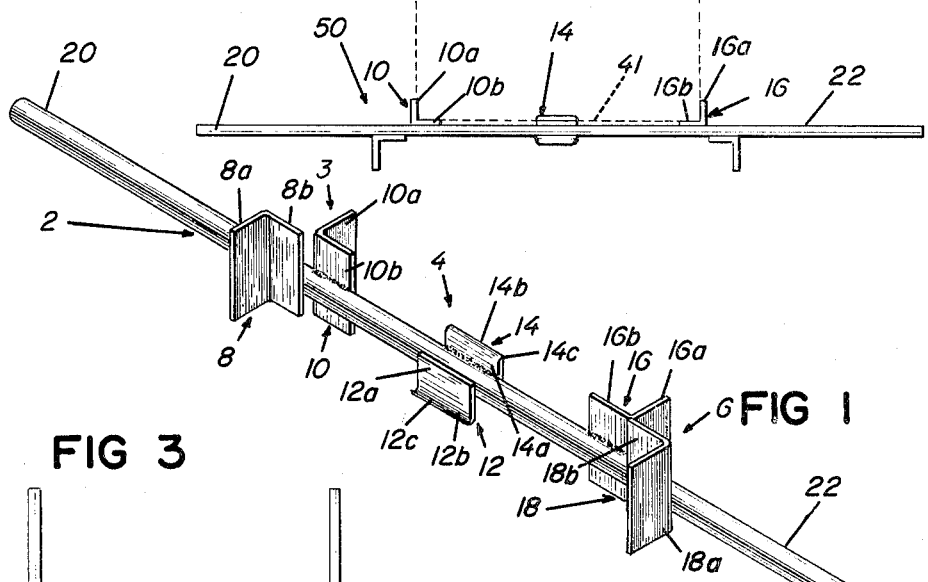
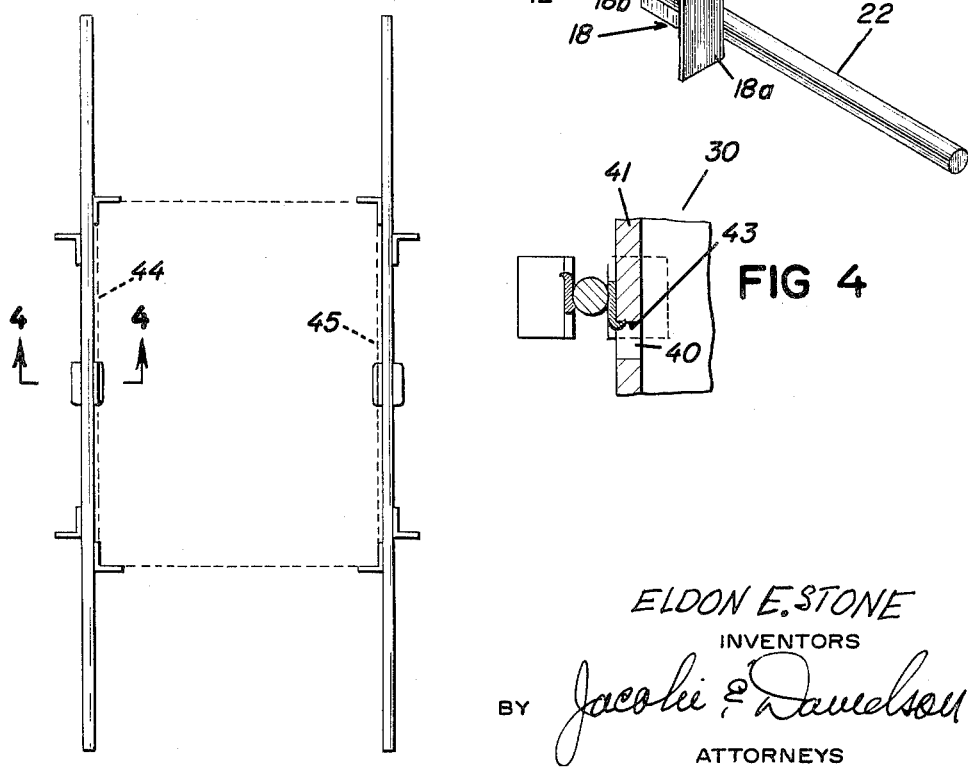
ELDON E. STONE
INVENTORS
BY Jacobi & Davidson
ATTORNEYS

United States Patent Office 3,214,209
Patented Oct. 26, 1965

3,214,209
MEANS FOR SUPPORTING AND TRANSPORTING PARALLELOGRAM CONTAINERS
Eldon E. Stone, R.F.D. 1, York, Nebr.
Filed Aug. 23, 1963, Ser. No. 304,133
8 Claims. (Cl. 294—15)

This invention relates generally to means for supporting and transporting parallelogram containers, and finds particular utility when employed in connection with bee hives and like devices.

Domesticated and/or commercial bee hives are often housed in containers of parallelogram cross-section. While these containers facilitate handling of the bee hives, it is often desirable for personnel working with the same to transport the container and bee hive housed therein from position to position without directly touching the container. In some instances, the container and enclosed bee hive are sufficiently light that the operator can move the same from place to place by himself, but in the normal instance, with a bee hive of any size, the transporting operation can be more efficiently performed by two persons. Accordingly, there has been a need for a device which could be releasably engaged with the hive container, and which would efficiently support the hive container so that the same could be easily transported from position to position without requiring the personnel handling the same to directly engage the container.

Various prior suggestions have been made with respect to the provision of bee hive carriers, but the prior suggestions have either required modification of the bee hive container, or some comparatively expensive construction. In contrast, the present invention provides a simple and comparatively inexpensive device adapted to efficiently be used in the transporting of bee hives.

Although the invention finds specific utility when used with bee hives, it should be understood from the outset of the present specification that the device hereof can be employed in the handling of containers generally. Thus, in a more basic sense, a primary object of the present invention is to provide a novel device for supporting and transporting containers, and more particularly, to provide such a device which permits two persons to conveniently lift and carry a container of parallelogram cross-section.

It is a further important and general object of the present invention to provide supporting devices which are releasably engagable with such containers and which can be used in pairs to lift a parallelogram container and move the same from place to place without permitting tilting of the container relative to the supporting devices during the movement. Even further in this regard, it is an important object of the invention to provide such devices which do not require modification to the container, and which, by virtue of their construction, provide a pair of handle grips on opposite sides of a container to be handled so that the same can conveniently be transported by two or more persons.

Consistent with the foregoing general objects of the present invention, there are certain specific objects hereof, including (a) the provision of carrying devices conforming with the preceding objects which can be used in pairs to handle a parallelogram container and which support the container and prevent movement thereof both longitudinally and laterally of the devices; (b) the provision of such carrying devices which comprise a simple combination of expedients including an elongated support and a plurality of brackets fixed on the support to engage the container in essentially three mutually perpendicular directions; (c) the provision of such carrying devices wherein the brackets fixed on each support are of simple construction so as to provide trouble-free operation over continued periods of time; and (d) the provision of such devices which can be manufactured with existing equipment and techniques and from varying types of existing materials.

The invention lies in the combination, construction, arrangement and disposition of the various means and component parts incorporated in devices constructed hereunder. The invention will be better understood and objects other than those specifically set forth above will become apparent when consideration is given to the following detailed description.

Such description refers to the annexed drawing which presents a preferred and illustrative embodiment of the invention. In the drawing:

FIGURE 1 is a perspective view of a carrying device constructed in accordance herewith;

FIGURE 2 is a plan view showing a pair of devices constructed in accordance herewith disposed in cooperative engagement with opposite ends of a parallelogram container so as to support the same for transportation from one point to another;

FIGURE 3 is a plan view, similar to FIGURE 2, but showing a pair of devices constructed in accordance herewith in cooperative engagement with opposite sidewalls of a parallelogram container so as to support the same for desired transportation; and FIGURE 4 is a fragmental detailed view, taken on the line 4—4 of FIGURE 1, and showing the preferred form of gripping elements incorporated on devices constructed in accordance with the invention.

If detailed reference is now made to FIGURE 1, it will be noted that the device shown therein comprises an elongated support generally designated by the numeral 2, and a plurality of sets of brackets 3, 4 and 6 which are fixed on the support 2. The set 2, as shown, comprises two individual bracket means 8 and 10. Similarly, the set 4, as shown, comprises the two bracket means 12 and 14, and the set 6, as shown, comprises the two bracket means 16 and 18. Individual bracket means of each elements, one group comprising the bracket means 8, 12 and 18, and the other group comprising the bracket means 10, 14 and 16.

As explained in more detail below, individual bracket means in each group are disposed in cooperation with other bracket means of the same group so as to prevent movement of a container with respect to the support 2 in a different one of three mutually perpendicular directions.

Before turning to the utilization of the device shown in FIGURE 1, it is desirable for purposes of this description to initially further consider the detailed construction of the individual elements. The support 2 preferably takes the form of an elongate one-piece bar member having free end portions 20 and 22. The bracket means 8 and 10 and the bracket means 16 and 18 preferably each comprise a right angle bracket. Each right angle bracket, in turn, preferably comprises a pair of plate members perpendicularly disposed with respect to one another. For example, the bracket element 8 includes the plate member 8a and the plate member 8b, the bracket element 10 includes the plate member 10a and the plate member 10b. Similar corresponding designations are used for the plate members of the bracket means 16 and 18.

In contrast with the construction of the bracket means 8, 10, 16 and 18, the bracket means 12 and 14 each comprise a plate member, 12a and 14a respectively, and a gripping element, 12b and 14b respectively, in the form of an outwardly and upwardly bent extension from the plate member. Each of the gripping elements 12b and 14b terminates in a sharp edge, 12c and 14c respectively, which edge extends parallel to the longitudinal axis of the elongated support or bar 2.

As indicated above, the relative disposition of the respective bracket means or bracket elements is an important factor in accordance with the invention. In this particular connection, it is to be noted that the bracket means 8 and 18 are fixed on the bar in spaced apart relation to one another and inwardly of the ends of the bar whereby the end portions 20 and 22 of the bar 2 provide handles. The bracket means 12, which serves as a gripping means, is fixed on the bar 2 intermediate to bracket means 8 and 18.

Similarly, the bracket means 14, which also serves as a gripping means, is fixed on the bar 2 intermediate the respective bracket elements 10 and 16. Thus, if the individual bracket means of each group are considered separately, one finds that first and second bracket means (bracket means 8 and 18) are fixed on one side of the bar 2 in spaced apart relation to one another and inwardly at the ends of the bar whereby the end portions of the bar proivde handles, and that a gripping means (bracket element 12) is fixed on the same side of the bar between the first and second bracket means.

The immediately preceding relatively generic description of the construction is equally applicable in the same light to the respective bracket means 10, 14 and 16, where the bracket means 10 and 16 comprise first and second bracket means fixed on the opposite side of the bar 2 and the bracket means 14 comprises a gripping means fixed on such side of the bar intermediate the first and second bracket means.

Although not specifically mentioned above, it should be apparent from the drawing that the bracket means 10 and 16, while spaced apart, are somewhat closer together than the bracket means 8 and 18. The reason for the difference in separation distances between the respective pairs of bracket elements is to permit the use of the device of FIGURE 1 in connection with containers of differing size, or with specific relation to bee hive containers, to permit the use of the device of FIGURE 1 in supporting opposite ends of the container, or alternatively, opposite sides of the container.

If reference is now made to FIGURE 2, it will be noted that two devices as shown in FIGURE 1 are presented in cooperative engagement with a parallelogram container generally designated by the numeral 30. For convenience, one of the devices is generally designated by the numeral 50, and the other of the devices generally by the numeral 50'. Both devices correspond to the device shown in FIGURE 1. However, prime symbols have been used on the device 50' to simplify this explanation.

Since the devices 50 and 50' extend parallel to the ends of the container 30, the bracket means 10 and 16 are shown in engagement with opposed corner portions adjacent one end of the container 30, and the bracket means 10' and 16' are shown in engagement with adjacent corner portions at the other end of the container 30. The container 30, as shown in FIGURE 4, is provided with handle recesses 40 in the end walls 41 and 42 thereof. FIGURE 4 only presents the recess 40 in the end wall 41 but it will be understood that a similar recess appears in the end wall 42.

The sharp edge 12c of the gripping element 12b of the device 50 engages the upper surface 43 of the recess 40 when the device 50 is in the position shown in FIGURE 2. Similarly, the corresponding sharp edge 12c' of the gripping element 12b' of the device 50' would engage the corresponding upper edge of the corresponding recess in the end wall 42 of the container 30. When the container is made of certain materials, (e.g. wood) the sharp edge cuts slightly into the upper surface of the recess thereby insuring a positive grip on the container. The cutting takes place as the container is lifted.

It is important to note from FIGURE 2 that when the gripping elements are engaged as aforesaid, the respective plate members or elements 10b and 16b of the respective bracket means 10 and 16, are in engagement with the end wall 41. Similarly, the plate members or elements 10b' and 16b' of the respective bracket means 10' and 16' are in engagement with the end wall 42 of the container 30. In contrast, the plate members or elements 10a and 10a' of the respective bracket means 10 and 10' are in engagement with one side wall of the container 30, and the plate members or elements 16a and 16a' of the respective bracket means 16 and 16' are in engagement with the opposite side wall of the container 30.

The plate members 10b and 16b thus form a basic support means fixed on one side of the bar inwardly of the ends of the bar, and as such, the basic support means includes the supporting surfaces of plate members 10b and 16b, disposed in a common plane parallel to the longitudinal axis of the bar. The plate members 10a and 16a form first and second projecting support members fixed to the bar inwardly of the ends thereof and on opposite sides of the basic support means. The first and second support members 10a and 16a, consistent with this definition, have support surfaces disposed in perpendicular relation not only to the supporting surfaces of the plate members 10b and 16b, but also in perpendicular relation to the longitudinal axis of the bar 2. Of course, the supporting surfaces of the respective plate members 10a and 16a extend outwardly of the same side of the bar, and correspondingly, the gripping element 14b extends outwardly to such side.

In operation of the arrangement as cooperative engaged with the container 30 in the manner shown in FIGURE 2, the container is supported against tilting movement perpendicular to the longitudinal axis of the devices 50 and 50' by the respective plate members 10a, 10a', 16a and 16a'. The container is supported against tilting movement parallel to the longitudinal axis of the respective devices 50 and 50' by the respective plate members 10b, 10b', 16 and 16b'. Furthermore, the container is supported vertically by the respective gripping elements 14 and 14' which engage with the handle recesses in opposite ends of the container. Of course, it will be readily appreciated that one group of bracket means on each of the devices 50 and 50' is not used when the container 30 is supported at opposite ends thereof.

However, when the container is supported at opposite sides, as shown in FIGURE 3, then the set of bracket elements not used in FIGURE 2, become of importance, and the bracket elements used with the arrangement of FIGURE 2, become an appendage to the respective devices. In the arrangement of FIGURE 3, the devices 50 and 50' are presented in generally the same manner as in FIGURE 2, but in this instance, as noted, the same extend parallel to the sides of the container designated in FIGURE 3 also by the numeral 30. The support in FIGURE 3 is provided by the bracket elements 8, 8', 18, 18' and 12 and 12'. In each instance, there is a corresponding engagement and supporting by the bracket means, and their respective component parts which corresponds identically with the engagement and supporting achieved in FIGURE 2. The container 30 of FIGURE 3, however, has the handle recesses 40 in the sidewalls 44 and 45 thereof, in addition to, or as opposed to in the end walls thereof. Since the cooperative engagement of corresponding brackets and supporting elements is the same basically in FIGURES 2 and 3, repetition of the details appear unnecessary. One further factor, worthy of mention however, resides in the fact that the bracket element or gripping means 12 is disposed in reverse relation to the bracket element or gripping means 14. Specifically, by again referring to FIGURES 1 and 4, it will be noted that the gripping element 12b comprises a bent over and upturned extension from the plate member 12a which extends in the reverse direction from the gripping element 14b. Specifically, the edges 14c and 12c are parallel to one another, but are supported by extensions facing in opposite directions.

Although not specifically pointed out above, it is to be understood that the handle portions 20 and 22 of the device of FIGURE 1 permit operators to grip the elongated support or bar 2. Thus, if it is desired to transport the container 30 shown in FIGURE 2, for example, from one position to another, one operator might well grip the handle portions 22 and 22' and another operator might well grip the handle portions 20 and 20'. In this manner, two individuals or operators can easily transport the container 30 from position to position.

The particular materials which are utilized in forming devices constructed in accordance herewith can vary, depending on particular needs. In some instances, it can be highly desirable to construct the entire assembly from metal component parts because of needed strength. In other instances, the bracket elements can be constructed from wood or plastic, and similarly the elongated support can be formed of a compatible material. The advantage of using a metal construction throughout resides in the strength properties, as well as the feasibility of securing the components in position by means of a welding operation. The size of the components can be varied, but the bracket means should be so constructed that the supporting surfaces thereof extend both above and below the bar 2 so that sufficient positive engagement with the container exists. Consistent with this consideration, the bracket means preferably include rectangular plate members disposed with their longest side normally extending vertically.

After reading the aforegoing detailed description of an illustrative and preferred embodiment of the instant invention, it should be apparent that the objects set forth at the outset of the present specification have been successfully achieved. Accordingly, what is claimed is:

1. A device for sue in carrying a parallelogram container having a handle recess therein, said device comprising:
    (a) an elongated bar;
    (b) basic support means fixed on one side of said bar inwardly of the ends of said bar, said basic support means including supporting surfaces disposed in a common plane parallel to the longitudinal axis of said bar;
    (c) first and second projecting support members fixed to said bar inwardly of the ends thereof, one of said members being secured to one side of and the other of said members being secured to the opposite side of said basic support means, said first and second support members having support surfaces disposed in perpendicular relation to said supporting surfaces of said basic support means and to the longitudinal axis of said elongated bar, said support surfaces of said first and second projecting support members extending outwardly of said one side of said bar;
    (d) gripping means fixed on said bar between said first and second support members, said gripping means including a gripping element extending outwardly of said one side of said bar.

2. The device as defined in claim 1 wherein said basic support means comprises a pair of first and second base plate elements, and wherein said first and second projecting support members comprise first and second projecting plate elements.

3. The device defined in claim 2 wherein said first base plate element and said first projecting plate element are integrally formed as one right-angle bracket, and wherein said second base plate element and said second projecting plate element are integrally formed as another right-angle bracket.

4. The device defined in claim 3 wherein said gripping means comprises a plate member fixed on said bar in said common plane parallel to the longitudinal axis of said bar and wherein said gripping element comprises an outwardly and upwardly bent extension from said plate member terminating in a sharp edge extending parallel to said longitudinal axis.

5. The device defined in claim 1 wherein said gripping means comprises a plate member fixed on said bar in said common plane parallel to the longitudinal axis of said bar and wherein said gripping element comprises an outwardly and upwardly bent extension from said plate member terminating in a sharp edge extending parallel to said longitudinal axis.

6. The device defined in claim 1 and further including:
    (e) additional basic support means fixed on the other side of said bar inwardly of the ends of said bar, said additional basic support means including supporting surfaces disposed in a common plane parallel to the longitudinal axis of said bar;
    (f) additional first and second projecting support members fixed to said bar inwardly of the ends thereof, one of said members being secured to one side of and the other of said members being secured to the opposite side of said additional basic support means, said additional first and second support members having support surfaces disposed in perpendicular relation to said supporting surfaces of said additional basic support means and to the longitudinal axis of said elongated bar, said support surfaces of said additional first and second projecting support members extending outwardly of said other side of said bar; and
    (g) additional gripping means fixed on said bar between said additional first and second support members, said additional gripping means including an additional gripping element extending outwardly of said other side of said bar;
    (h) said additional gripping element having disposed in reverse position to the first mentioned gripping element.

7. A device for use in carrying a parallelogram container having a handle recess therein, said device comprising:
    (a) an elongated bar;
    (b) first and second bracket means fixed on said bar in spaced apart relation to one another and inwardly of the ends of said bar whereby the end portions of said bar provide handles;
    (c) gripping means fixed on said bar intermediate said first and second bracket means;
    (d) each of said bracket means comprising a pair of members disposed respectively to engage meeting sides of a container at a corner junction therebetween;
    (e) said gripping means including a gripping member disposed to engage the handle recess in the container.

8. In combination with a parallelogram walled container having a handle recess therein, a pair of carrying devices disposed on opposite sides of said container, each said device comprising:
    (a) an elongated support,
    (b) spaced bracket means on said support for engaging adjacent portions of meeting walls of said container at aligned corners of said container, said bracket means being disposed inwardly of the ends of said support, and
    (c) gripping means intermediate said bracket means for engaging said handle recess,
whereby said container is supported by said bracket means against movement longitudinally and laterally of said support and is engaged by said gripping means to be lifted by said support.

References Cited by the Examiner
UNITED STATES PATENTS
884,434    4/08    Walgamott _____ 294—15

FOREIGN PATENTS
35,258    7/22    Norway.
81,463    11/49   Norway.

SAMUEL F. COLEMAN, Primary Examiner.

ERNEST A. FALLER, Examiner.